H. I. Seymour,
Wood Molding Machine.
N° 40,286. Patented Oct. 13, 1863.
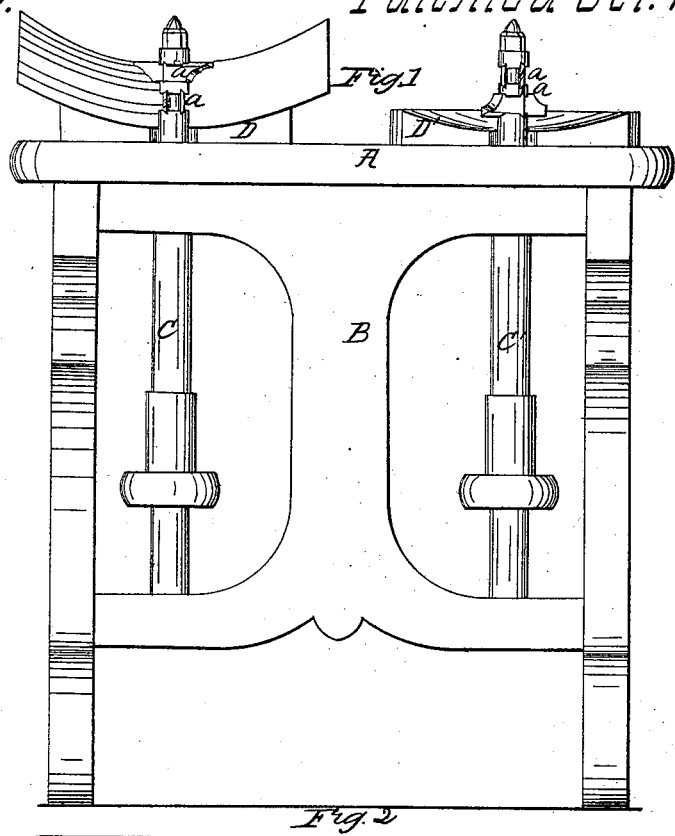
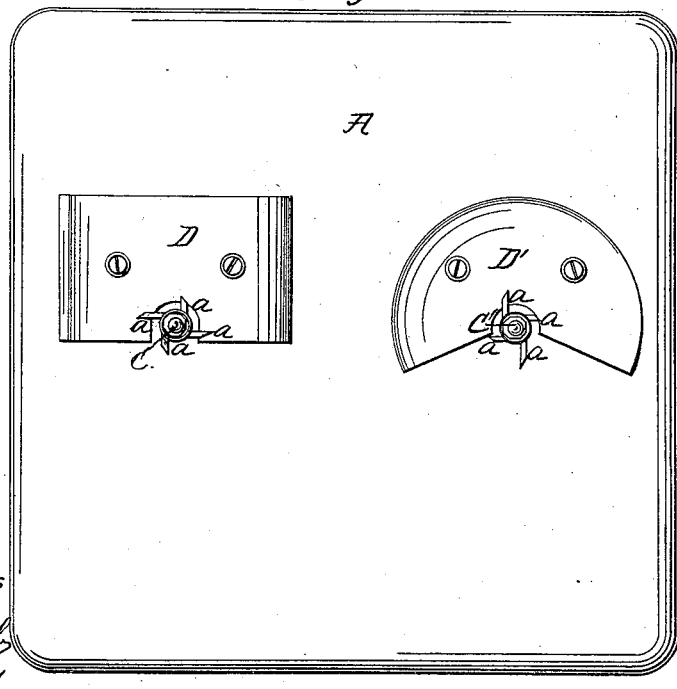
Witnesses
Inventor
H. I. Seymour
By Munn & Co
Att'y

UNITED STATES PATENT OFFICE.

HENRY I. SEYMOUR, OF TROY, NEW YORK.

IMPROVEMENT IN MOLDING-MACHINES.

Specification forming part of Letters Patent No. 40,286, dated October 13, 1863.

*To all whom it may concern:*

Be it known that I, H. I. SEYMOUR, of Troy, in the county of Rensselaer and State of New York, have invented a new and improved machine for cutting moldings on curved wooden articles, such as chair-backs, &c.; and I do hereby declare that the following is a full, clear, and exact description of the same, reference being had to the accompanying drawings, making a part of this specification, in which—

Figure 1 is an elevation of my invention; Fig. 2, a plan or top view of the same.

Similar letters of reference indicate corresponding parts in the two figures.

The object of this invention is to obtain a simple means whereby curved articles—such, for instance, as the backs of chairs—may have a molding cut on each edge and by an ordinary rotating cutter.

To this end the invention consists in the employment or use of a curved bed, either convex or concave, attached to the bed of a molding-cutting machine, and in such relation with the cutters thereof as to effect the desired result.

To enable those skilled in the art to fully understand and construct my invention, I will proceed to describe it.

A represents the bed of an ordinary machine for cutting moldings; B, the framing which supports the bed, and C C' two vertical arbors, which pass through the bed A, and are provided with cutters *a* at their upper parts above the bed. These parts, being all old and well known, do not require a minute description.

On the bed A and by the side of each arbor C C' there are secured supplemental beds D D'. These supplemental beds may be attached to the bed proper, A, in such a manner that they may be detached when desired and the machine used for cutting moldings on straight work, as usual.

The supplemental bed D has its upper or face side made in concave form, the curvature corresponding to that of the article on which the molding is to be cut. (See Fig. 1, in which the article to be operated upon is shown in red outline.) The center of the bed D is in line with the center of the arbor C, and the bed D is of such a height or thickness that the cutters *a* of said arbor C will, when the article to be operated upon is placed on said bed, have a proper relative position with the article, so as to act properly upon it.

The article shown in red outline on the supplemental bed D is, when the arbor C is rotated, shoved along on the bed D by hand or otherwise, and in passing the cutters *a* of said arbor has the molding cut upon it. The bed D, it will be seen, in consequence of having its curved upper surface to correspond with the curvature of the article to be operated upon, serves as a guide for the latter, and causes every point of it that is brought within the compass of the action of the cutters to be properly acted upon, and the molding will therefore be cut upon the curved surface equally as well as upon a straight stick shoved along upon a horizontal bed like A.

The supplemental bed D' is simply a modification of the device, the bed D' being a section of a sphere to admit of the article to be operated upon being moved or shoved in the arc of a circle around the cutters of the arbor C', where moldings are to be cut on the concave edges of work. This modification is also necessary where moldings are to be cut at the ends of curved articles, like that represented on bed D, as the bed D' admits of said work or article being shoved endwise past the cutters. These supplemental beds may be of various forms, according to the form or shape of the articles to be operated upon.

It will be seen from the above description that it is not essential that the upper or face sides of the beds D D' be concave. They may be convex, and the same end attained, as they would serve as guides in either case.

Having thus described my invention, what I claim as new, and desire to secure by Letters Patent, is—

The employment or use, in a machine for cutting moldings, of a supplemental curved bed, either concave or convex, corresponding in curvature with the curvature of the article on which the moldings are to be cut, and placed in such relation with the cutters as to serve as a guide for the work or article to be operated upon, substantially as herein described.

HENRY I. SEYMOUR.

Witnesses:
D. H. HUMPHREY,
H. RICHARDSON.